Feb. 2, 1954 W. S. BURT 2,668,246
PHOTOCELL ANGLE RESPONSE COMPENSATOR
Filed Nov. 24, 1950 2 Sheets-Sheet 1

Inventor:
Wesley S. Burt,
by Russell A. Warner
His Attorney.

Inventor:
Wesley S. Burt,
by Russell A. Warner
His Attorney.

Patented Feb. 2, 1954

2,668,246

UNITED STATES PATENT OFFICE 2,668,246

PHOTOCELL ANGLE RESPONSE COMPENSATOR

Wesley S. Burt, Lynn, Mass., assignor to General Electric Company, a corporation of New York Application November 24, 1950, Serial No. 197,354

1 Claim. (Cl. 250—237)

My invention relates to photocell angle response compensators, and its object is to provide a simple shading and reflector attachment for photocells so that the cell will give an output which is a true measure of the light intensity on its surface, regardless of the angle at which the light rays strike the surface. The invention is particularly useful for the accurate measurement of low intensity illumination such as used for street lighting.

Figure 1:
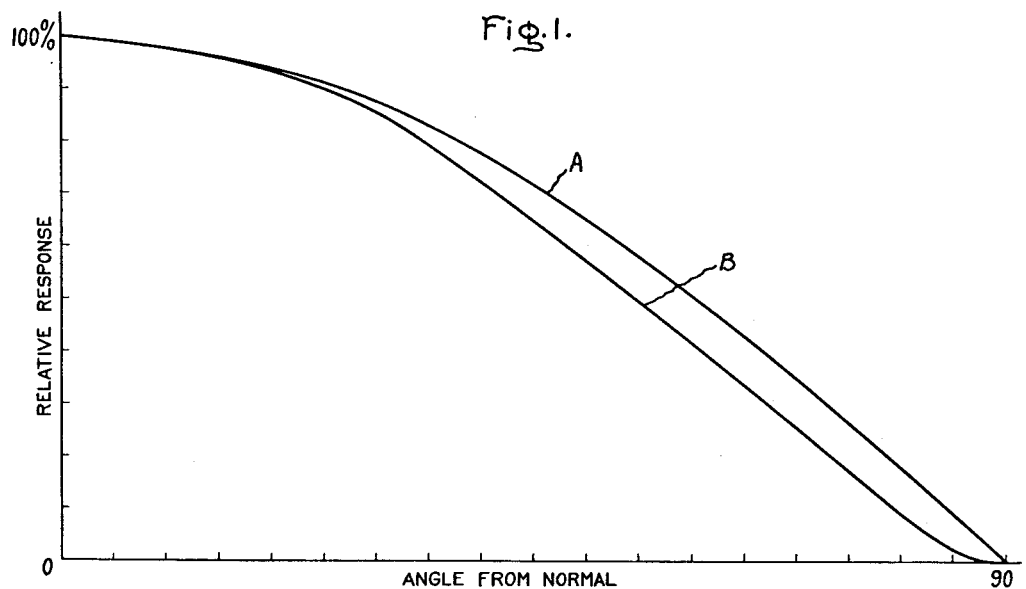
Figure 5:
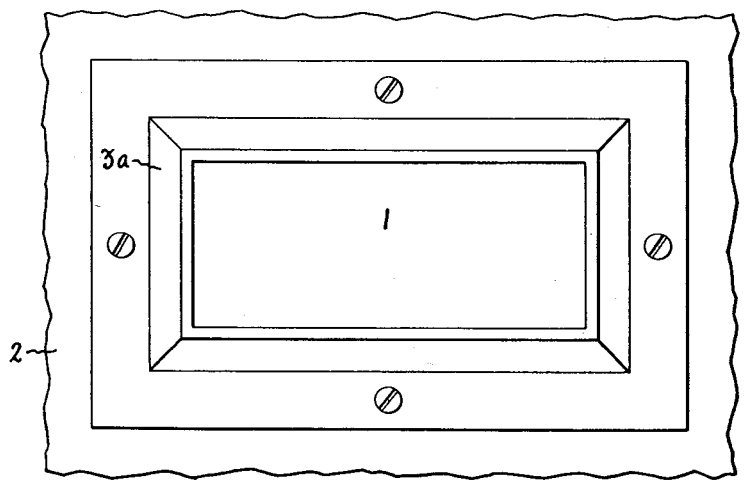
Figure 4:
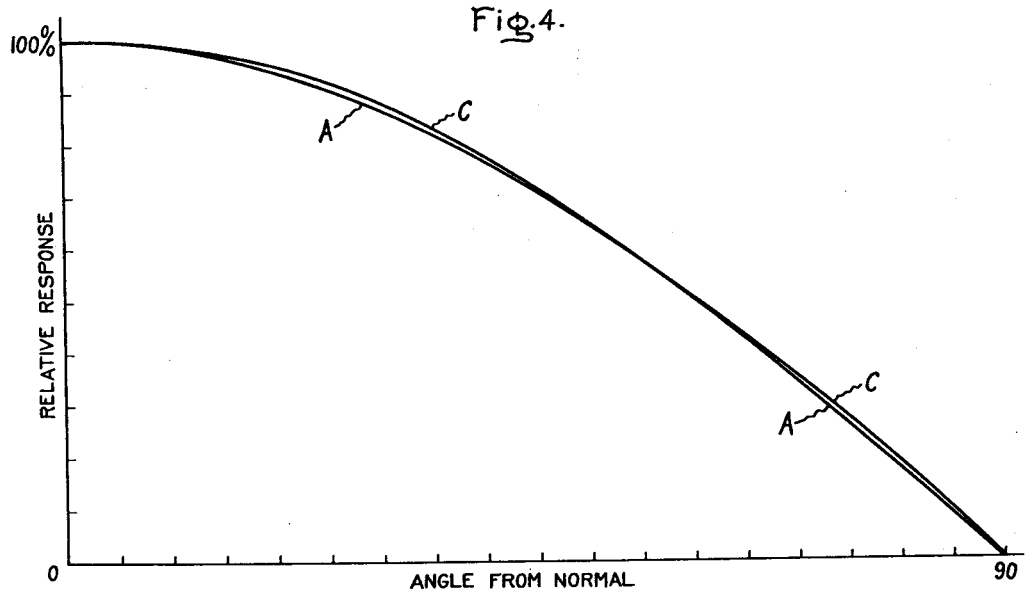
Figure 2:
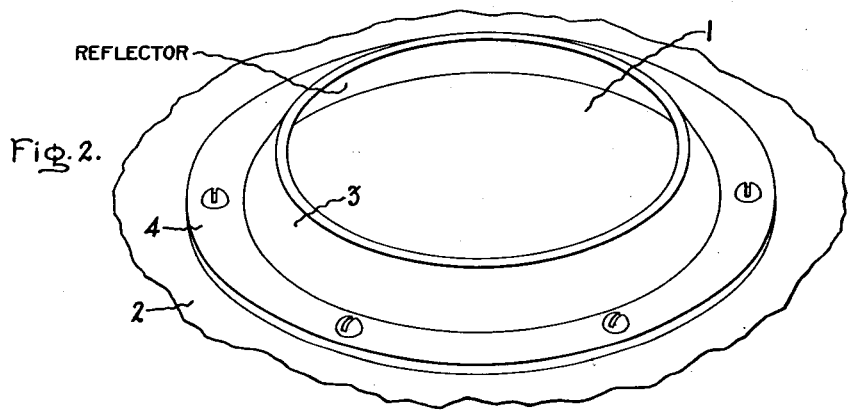
Figure 3:
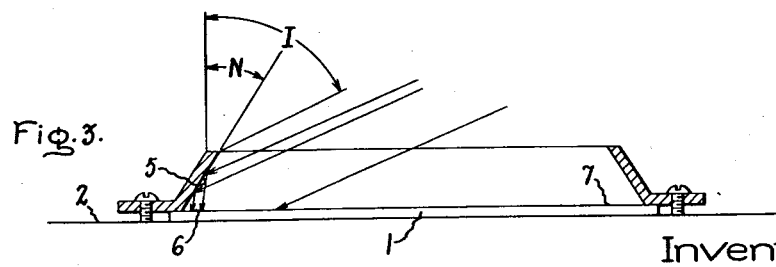

The features of my invention which are believed to be novel and patentable will be pointed out in the claim appended hereto. For a better understanding of my invention reference is made in the following description to the accompanying drawings in which Fig. 1 shows comparative curves plotted between photocell output and angle of incident light from normal which will be referred to in explaining my invention. Fig. 2 shows a perspective view of one of my compensators as attached to a photocell and its mounting structure. Fig. 3 shows a cross-sectional center side view of the apparatus shown in Fig. 2. Fig. 4 shows curves corresponding to those of Fig. 1 after compensation of the cell, and Fig. 5 shows a compensator for use on rectangular cells.

When light strikes a surface such, for example, as the surface of a street, the generally accepted measurement basis for the illumination of such surface depends upon the intensity of the light and the cosine of the angle from normal at which the light strikes the surface. For example, if the illumination of a surface for a given light intensity with the light rays normal to the surface is 100 in Fig. 1, the illumination of the surface, with the same light intensity but with the light striking the surface at various angles up to 90 degrees from normal, will decrease according to the cosine curve A. If a light cell be used to measure the illumination of any surface correctly with the light striking the surface at various angles, it should have an output response characteristic corresponding to curve A, Fig. 1. Light cell output generally departs from the desired cosine curve A characteristic in that the output falls below such curve at high incident angles from normal, due to reflection of light from the surface of the cell. Curve B, Fig. 1, is typical of the angle responsive characteristics of an uncompensated cell.

In Fig. 2, I have represented a circular light cell 1 mounted on a supporting surface 2, which cell is provided with one of my angle response compensators 3. For the circular cell represented, the compensator consists of a hood in the form of a right circular, hollow, truncated cone with parallel open base and top as shown, with the diameter of the base equal or slightly less than the diameter of the cell. The compensating hood is preferably provided with an outwardly extending flange part 4 or other means for securing it in place over the cell as represented. The cone is made of opaque material and its inner surface is a good reflector, reflecting 95 per cent of the light or better. When such a compensating cone of the proper geometry is placed on a cell which without compensation has the output response incident angle characteristics of curve B, Fig. 1, it changes the output response incident angle characteristics to substantially that of the cosine curve A. The main reason for this is that at the high angles of incidence, light rays are reflected from the inner mirror surface of the cone onto the light cell surface, and a portion of the cell not only receives direct light rays but also efficiently reflected light rays. Thus, in Fig. 3, where the angle of incidence I is represented to be greater than 30 degrees, rays strike the mirror surface in the area 5 and are reflected to an area 6 of the cell also receiving direct light rays. The reflected light rays strike the light cell at a low angle from normal. As a result the activity of that portion of the cell receiving direct and reflected light is greatly increased.

While an area in the region 7 is shaded from direct light rays, this area would have a relatively low output if unshaded with the light at the high angle of incidence from normal represented. The loss of output from the shaded area is more than made up by the reflected light rays, because these reflected light rays strike the cell at a relatively small angle of incidence from normal, under which condition loss of cell output by light reflection from the cell surface is nil and the response high.

When the light rays are normal to the cell surface or within the angle N, Fig. 3, that area of the cell receiving direct light rays from any given direction is equal to the area opening of the top of the cone, and hence, the cell does not have as high an output as it would have if the compensator were removed under such conditions. However, we are not here concerned with the maximum current output but with the output-incident angle characteristic of the compensated cell. The over-all result of the use of such a compensator is the production of a cell output-incident angle characteristic which can be made to conform very closely to a cosine curve A of Fig. 1. The compensator is effective with light rays received from several directions at the same time.

In Fig. 4, C is the output-angle of incident curve for a cell corrected with my compensator, such as has been described and which without compensation had a characteristic like curve B, Fig. 1. Curve A, Fig. 4, is a true cosine for the purpose of comparison with curve C. The cell used was a circular cell four inches in diameter. The compensator used was a cone having a 60-degree angle between its side and base (angle N, Fig. 3=30 degrees), a base opening diameter of 3⅞ inches, and a height of $\frac{7}{16}$ inch.

The angle which the reflector surface 5 makes with the surface of the cell should be that angle where in the uncompensated cell the output curve starts to depart from a true cosine curve, and for the cells used I have found this to be about 30 degrees from normal.

Increasing the height of the compensator cone decreases the direct light striking the cell at all incident angles in relation to the amount of compensator reflected light rays striking the cell at high incident angles from normal. The height of the cone should thus be proportional to the amount of compensation needed for a given diameter of cell and compensator, and the height should of course be increased if the cell and compensator diameters are increased. I have found that for the type of cell used, best compensation is obtained using a 60-degree angle between cone side and base and height to diameter ratio of about 1/9. It is quite likely that these proportions will require adjustment for different makes of cells for best over-all compensation, and the invention is not to be limited in this respect.

It is also evident that for square or rectangular cells, I could use a compensator of truncated pyramidical shape of a geometry suited for the cell to be compensated. Such a compensator is represented at 3a in Fig. 5 and would be used at that angle to the prevailing light for which calibrated.

What I claim as new and desire to secure by Letters Patent of the United States is:

In combination with a circular light cell, a compensator therefor comprising a hood shaped as the surface of a right circular cone with open top and bottom parallel to each other and with the bottom opening approximately equal to the area of the cell and secured over and coaxial with the light sensitive surface of said cell, the hood being opaque with a good reflecting internal surface, the base angle of said cone being approximately 60 degrees and the ratio of height to base diameter of said hood being approximately 1/9.

WESLEY S. BURT.

References Cited in the file of this patent

UNITED STATES PATENTS

| Number | Name | Date |
|---|---|---|
| 1,764,368 | Thomas | June 17, 1930 |
| 1,935,698 | Decker et al. | Nov. 21, 1933 |
| 2,054,382 | Larsen et al. | Sept. 15, 1936 |
| 2,177,360 | Busse | Oct. 24, 1939 |
| 2,278,933 | Kott | Apr. 7, 1942 |
| 2,355,014 | Schorn | Aug. 1, 1944 |
| 2,427,528 | Hickok | Sept. 16, 1947 |
| 2,444,442 | Herbold | July 6, 1948 |
| 2,447,344 | Kliever | Aug. 17, 1948 |